T. WILSON.
Animal-Trap.

No. 225,251. Patented Mar. 9, 1880.

WITNESSES.
James B. Lizius.
R. P. Daggett

INVENTOR.
Thornton Wilson,
PER
C. Bradford
ATTORNEY.

N. PETERS, PHOTO-LITHOGRAPHER, WASHINGTON, D. C.

UNITED STATES PATENT OFFICE.

THORNTON WILSON, OF JACKSON TOWNSHIP, PARKE COUNTY, INDIANA.

ANIMAL-TRAP.

SPECIFICATION forming part of Letters Patent No. 225,251, dated March 9, 1880.

Application filed October 16, 1879.

*To all whom it may concern:*

Be it known that I, THORNTON WILSON, of the township of Jackson, county of Parke, and State of Indiana, have invented certain new and useful Improvements in Animal-Traps, of which the following is a specification, reference being had to the accompanying drawings, which are made part hereof, and on which similar letters of reference indicate similar parts.

Figure 1:
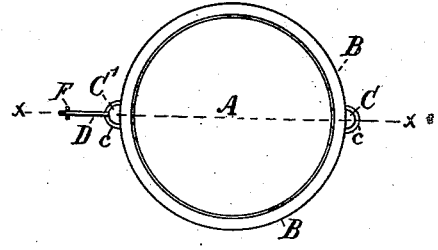
Figure 2:
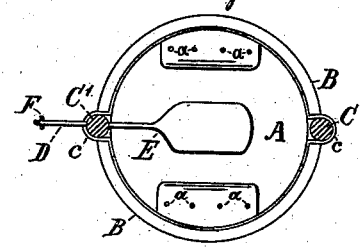
Figure 3:
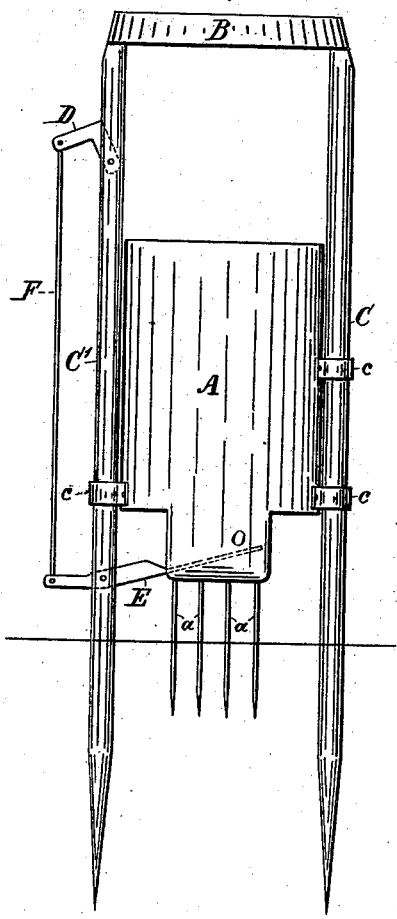
Figure 4:
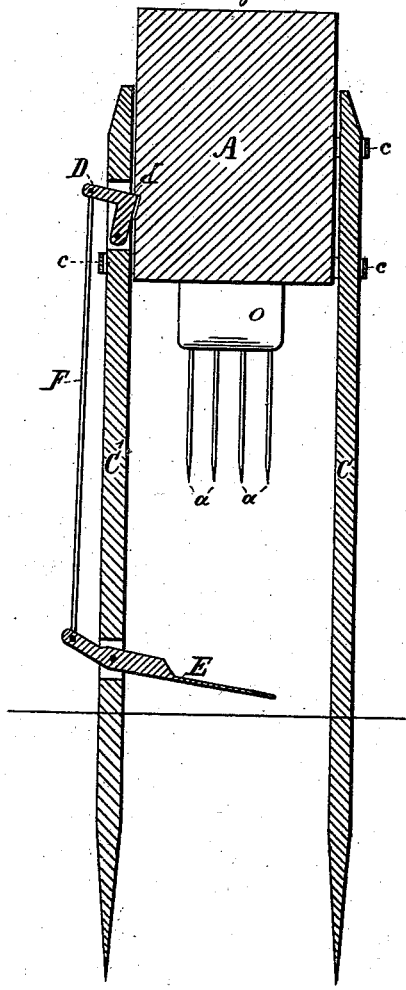

Figure 1 is a top or plan view of a trap embodying my invention. Fig. 2 is an underside plan as seen from the ground line. Fig. 3 is a side elevation of the trap after it is sprung. Fig. 4 is a vertical section of the trap when set and ready for use.

This invention relates to that class of animal-traps in which a weighted block provided with pointed prongs is sprung by means of a spring-catch and trigger to impale moles and other animals; and it consists in the employment of two posts in lieu of one, as heretofore used, to prevent binding, having their upper ends connected by a guide-ring, and used in connection with a notched sliding block provided with loops or guides, and having a divided or recessed portion, into which the needles are inserted, this block being sprung by a dog and lever, as will hereinafter be more fully set forth.

In said drawings, the portion marked A represents a block of considerable weight, in the lower end of which needles $a$ $a$ are inserted; B, a ring surrounding the block. C C' represent standards or legs pointed at their lower ends, and supporting the ring B, which connects them together; D, a catch in the pointed standard C', which engages with a notch, $d$, in the block A, thus operating to support said block when the trap is set; E, the trap-lever, by means of which, when the animal comes in contact with it, the trap is sprung, and F a connecting-rod connecting said catch and said lever together.

The object of my said invention is to produce a trap that shall be effective in catching small field animals which prey upon farm produce, especially those known as "moles" and "gophers."

The trap herein described effectually accomplishes this object, is simple in construction and operation, and does not require any bait or other attraction to render it effective.

It is operated by simply placing the legs C C' astride a path or track over which the animals named frequently pass, pressing them into the ground until the lever E is only a slight distance from it, so that the animals named cannot pass along their accustomed path without coming in contact with said lever. The habits of such animals are to burrow under rather than pass over obstructions placed in their way, and a slight effort in this direction springs the trap and catches the animal.

The block A is of considerable weight and fits loosely in the guide-ring B and between the pointed standards C C', so that its loops $c$ $c$ will be free to slide on the standards without binding in the ascent or descent of the block or fall when the trap is sprung, and by my construction the employment of an additional weight applied to the fall is dispensed with.

It will also be seen that in my construction the trap is readily sprung by the slightest upward pressure by the animal on the trigger, and that the latter is by the construction extremely sensitive and not liable to bind, as in a platform-trigger sliding on the standards.

I am aware that a block or fall provided with pointed prongs or needles and sliding on a single standard has heretofore been employed in combination with a spring-latch, bent arm, and bell-crank, as shown in Letters Patent granted to T. J. Brown for a mole-trap, dated November 26, 1872, No. 133,407, and I therefore lay no claim to such invention, which differs from my construction in that I employ, in lieu of one pointed standard, two such standards secured together by a guide-ring encompassing the block or fall, between which standards the block slides in falling, by which construction all liability of the binding of the fall on the standards in its descent is obviated, which binding is liable to occur, particularly in wet weather, when a single standard is employed.

I am also aware that a mole-trap provided with two standards and a fall sliding in said standards has heretofore been used in combination with a notched weighted rod attached to the fall, a platform sliding on the standards and raised by the animal, a tripping-rod, and button-lever, as shown in Letters Patent granted to R. J. Huggins for a mole-trap, dated December 30, 1873, No. 146,003, and I therefore lay no claim to such invention, which differs from mine in construction and result in that I dispense with the weighted rod liable to bind in the orifice of the cross-head in the descent of the fall, and that I also dispense with the sills and the platform-trigger of Huggins, sliding on the standards when raised by the animal, and liable to bind as it is raised on the standards and prevent the springing of the trap.

Having thus fully described my said invention, what I claim as new, and desire to secure by Letters Patent, is—

The pointed standards C C', connected at their upper ends by the guide-ring B, and the heavy sliding block A, provided with the projections $o$ $o$, pointed prongs $a$ $a$, loops $c$ $c$, and notch $d$, in combination with the lever E, connecting-rod F, and dog D, the whole constructed and arranged to operate in the manner and for the purpose set forth.

In witness whereof I have hereunto set my hand and seal at Indianapolis, Indiana, this 10th day of October, A. D. 1879.

THORNTON WILSON. [L. S.]

In presence of—
C. BRADFORD,
A. B. GILLETT.